United States Patent [19]

Bryant

[11] 3,794,812

[45] Feb. 26, 1974

[54] SENSING APPARATUS

[75] Inventor: Jack A. Bryant, Boston, Mass.

[73] Assignee: Electronics Corporation of America, Cambridge, Mass.

[22] Filed: Apr. 17, 1972

[21] Appl. No.: 244,757

[52] U.S. Cl. ..................235/61.11 E, 235/61.12 N, 250/219 D, 340/174.1 H, 340/146.3 Z

[51] Int. Cl... G06k 7/10, G11c 11/02, G06k 19/06, G01n 21/30

[58] Field of Search..............235/61.11 E, 61.12 R, 235/61.12 N, 61.11 R, 61.12 M, 61.11 F; 250/219 D, 219 DC; 340/146.3 Z, 146.3 AC, 174.1 H, 173 LT

[56] References Cited

UNITED STATES PATENTS

| | | | |
|---|---|---|---|
| 3,609,306 | 9/1971 | Langley | 250/219 D |
| 3,663,800 | 5/1972 | Myer | 235/61.11 E |
| 3,474,232 | 10/1969 | Hearn | 235/61.11 E |
| 3,636,317 | 1/1972 | Torrey | 235/61.12 N |
| 3,341,691 | 9/1967 | Modersohn | 235/61.11 E |
| 3,283,303 | 11/1966 | Cerf | 235/61.12 R |
| 3,588,457 | 6/1971 | Bijleveld | 235/61.12 N |
| 3,701,886 | 10/1972 | Jones | 235/61.11 E |
| 3,688,955 | 9/1972 | L'Huillier | 235/61.11 F |
| 3,229,073 | 1/1966 | Macker | 235/61.11 E |

*Primary Examiner*—Daryl W. Cook
*Assistant Examiner*—Robert M. Kilgore
*Attorney, Agent, or Firm*—Willis M. Ertman

[57] ABSTRACT

Sensing apparatus includes scanning means for producing electrical signals corresponding to code marks in a code on an article as the code is scanned along a path corresponding to the disposition of the code marks. The code defines a series of digit spaces and each digit space defines a plurality of digit value positions. The apparatus further includes means for generating a corresponding plurality of code-sampling gate signals in each digit space, a code-sampling gate signal being generated corresponding to each digit value position in each digit space, and means for producing an output in response to an electrical signal corresponding to a code mark produced by the scanning means coincident with a code-sampling gate.

14 Claims, 7 Drawing Figures

SENSING APPARATUS

SUMMARY OF INVENTION

This invention relates to sensing systems and more particularly to article scanning systems, for example systems of the type that may be used for article identification in an automatic sortation system or the like.

In an article sortation system, for example of the type sorting cartons on a conveyor system, the nature of the contents of each carton may be indicated by a code defined, for example by a set of code marks on the side of the carton. A sensing station adjacent the conveyor senses the code as the carton passes the sensing station and its output operates components of the sortation system to transfer the carton to a particular location as a function of the code on the carton. A variety of code configurations have been used for this purpose, among them a code arranged in two or more lines, the length of each line being a function of the number of digits in the code and each line indicating a different digit value; and a single line code in which each code element indicates a digit value and the digit value is determined by the width of the code element, for example a code element representing a binary one has twice the width of a code element representing a binary zero. Each of these code configurations require two or more scanners, the first code configuration requiring a scanner for each line and the second code configuration requiring a plurality of scanners for decoding the marks. The latter configuration also requires a longer total code length due to the several different widths of the code marks and the necessity to provide sufficient separation to differentiate between adjacent code marks.

It is an object of this invention to provide a novel and improved sensing system responsive to a simple code configuration.

Another object of the invention is to provide a novel and improved sensing system employing a single scanner.

Still another object of the invention is to provide a novel and improved article sortation system.

In accordance with the invention, there is provided sensing apparatus for use with an article having a series of code marks thereon. The sensing apparatus includes scanning means for producing electrical signals corresponding to code marks in a code on the article as the code is scanned along a path corresponding to the disposition of the code marks on the article, means for generating a code-sampling gate at a plurality of particular positions in each digit space of the code, and means for producing a digit value output in response to an electrical signal produced by the scanning means in response to a detected code mark corresponding to the particular code-sampling gate. In a particular embodiment a binary code is used and the code-sampling gate generation means generates a first gate in the lefthand portion of each digit space and a second gate in the righthand portion of each digit space, and the apparatus further includes means for producing a first output representing one binary digit when the first gate is coincident with the production by the scanning means of an electrical signal corresponding to a code mark, and a second output representing the other binary digit when the second gate is coincident with the production by the scanning means fo an electrical signal corresponding to a code mark. The code-sampling gate generating means includes logic that produces the code-sampling gate outputs, and is responsive to the production by the scanning means of an electrical signal corresponding to a code mark initiates a timing interval corresponding to the digit space. The duration of this timing interval may be variable if the scanning rate is variable.

A suitable article for use with such sensing apparatus comprises a sheet of material having at least one generally straight edge that provides a reference for guiding relative movement between the sheet and cooperating sensing apparatus along a path parallel to the straight edge. A series of code mark receiving locations are disposed in a single row that extends parallel to the straight edge of the sheet, each code mark receiving location defining a digit space having a plurality of positions in which a code mark can be placed. One and only one code mark detectable by the cooperating sensing apparatus is in each digit space, and the position of each code mark in its digit space in the direction parallel to the straight edge defines the value of the digit of that digit space. In a particular embodiment, the code marks and the sheet of material are of constrastingly different colors, each code mark is a printed bar and has a length dimension greater than twice its width dimension. Where the code bars in the series of digit spaces define a binary code, the width dimension of each code bar may be about one-half the width dimension of the digit space, thu providing a compact binary coded single line arrangement readable by a single scanner.

The code reading logic of the sensing apparatus, in preferred embodiments includes an ability to override perturbations that might be caused by the code printer mode printing a uniform code or by variations in the motion of the conveyor. The logic responds to both code signals and to digit space signals in an updating manner that eliminates accumulative error.

In a particular embodiment, as the scanner scans the code bars on the article, it produces an output signal that differentiates between the sensed absence of a code bar (the white label background) and the black code bar. The series of code cars are sensed sequentially by movement relative to the scanner and while the code may be sensed either by moving the scanner past the code or the code past the scanner, in that embodiment the code is moved past a fixed scanner station. Logic in the system starts a first ramp generator timer in response to the detection of a first control bar and stops the timer in response to detection of a second control bar. The resulting output defines a digit space signal. Each subsequently detected code bar resets logic that includes a second ramp generator timer that cycles through the digit space as a function of the digit space signal and produces the series of sampling gates. At a first predetermined time in each cycle, the sensor output is sampled and recorded as a function of whether or not a sensed code bar signal is being generated by the scanner and at a second predetermined time a check sampling gate is generated. Parity and other error check logic are incorporated in the system.

The invention provides a reliable sensing system responsive to a simple data code which is particularly useful in an article sortation system or the like. Other objects, features and advantages of the invention will be seen as the following description of a particular embodiment progresses, in conjunction with the drawings in which.

DESCRIPTION OF PARTICULAR EMBODIMENTS

Figure 1:
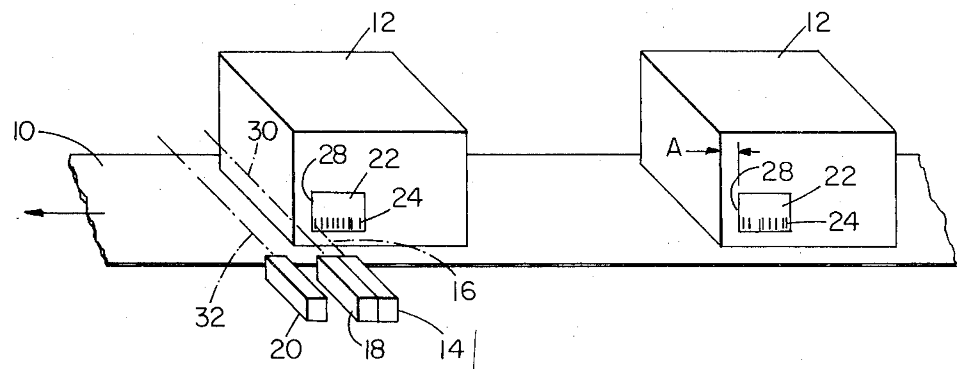
FIG. 1 is a diagrammatic view of a conveyor and components of a control system in accordance with the invention.

With reference to FIG. 1 there is shown a conveyor 10 on which is supported a series of cartons 12 for movement past a scanner station 14 that senses along path 16, a first gate system 18 and a second gate system 20. Each carton 12 has a label 22 located on the side wall of the carton that bears a series of bars 24 one in each digit space 26. The leading edge 28 of each label 22 is generally located at a predetermined distance A from the leading edge of the carton and the scanning path 16 of scanner 14 is spaced a corresponding distance from the scanning path 30 of gate system 18. Similarly, scanning path 32 of gate system 20 is spaced a distance corresponding to the length of the code on label 22 from path 30.

Figure 2:
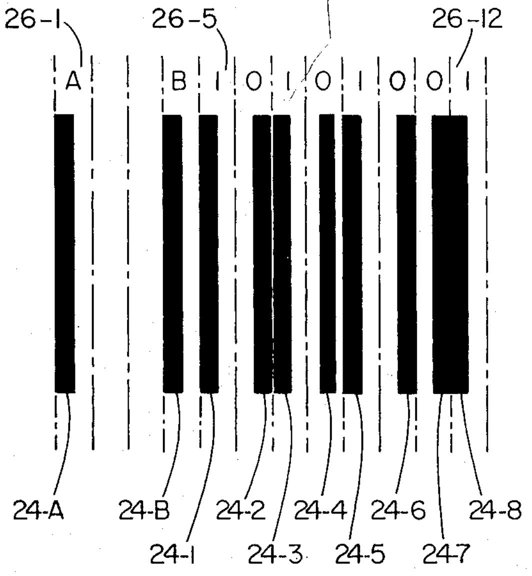
FIG. 2 is a diagram of a code arrangement on a label employed in the practice of the invention.

Additional details of the code configuration may be seen with reference to the diagram of FIG. 2. The code is based on a series of digit spaces 26, there being twelve digit spaces in the arrangement shown in FIG. 2. Each digit space is divided into a lefthand half and a righthand half, as binary coding is employed in this embodiment. A control or reference bar 24–A disposed in the lefthand half of space 26–1; a similar reference bar 24–B is disposed in the lefthand half of space 26–4; and a data code bar 24–1 - 24–8 is disposed in each corresponding digit space 26–5 – 26–12. In this code arrangement, if the data code bar is in the left half of the digit space, it is considered a binary ONE, while if it is in the right half of the digit space, it is considered a binary ZERO. Thus the code represented by the label shown in FIG. 2 is 10101001. While these code bars may be generated by various techniques, in a particular embodiment the serial code pattern is printed on the label 22 by a printer, which forms a code bar 24 that is 0.050 inch wide and 0.750 inch long. Each digit space 26 has a width of 0.1 inch. The control and code information, in a particular application, is applied to the label 22 by a "ticket printer" which applies a series of code bars to each label in an on-line system at a rate of 40 labels per minute, each "ONE" code bar character being offset to the left half of the digit space and each "ZERO" code bar character being offset to the right half of the digit space.

Figure 3:
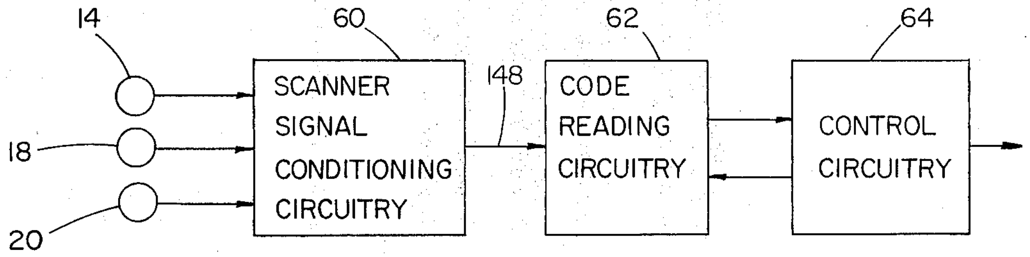
FIG. 3 is a block diagram of logic components of the system shown in FIG. 1.

As indicated in FIG. 3, the outputs of scanners 14, 18 and 20 are applied to signal conditioning circuitry 60 and that circuitry has an output over line 148 to code reading circuitry 62. The output of code reading circuitry 62 is applied to control circuitry 64 and that circuitry, upon completion of a code reading sequence feeds back a control signal to the code reading circuitry 62.

Figure 4:
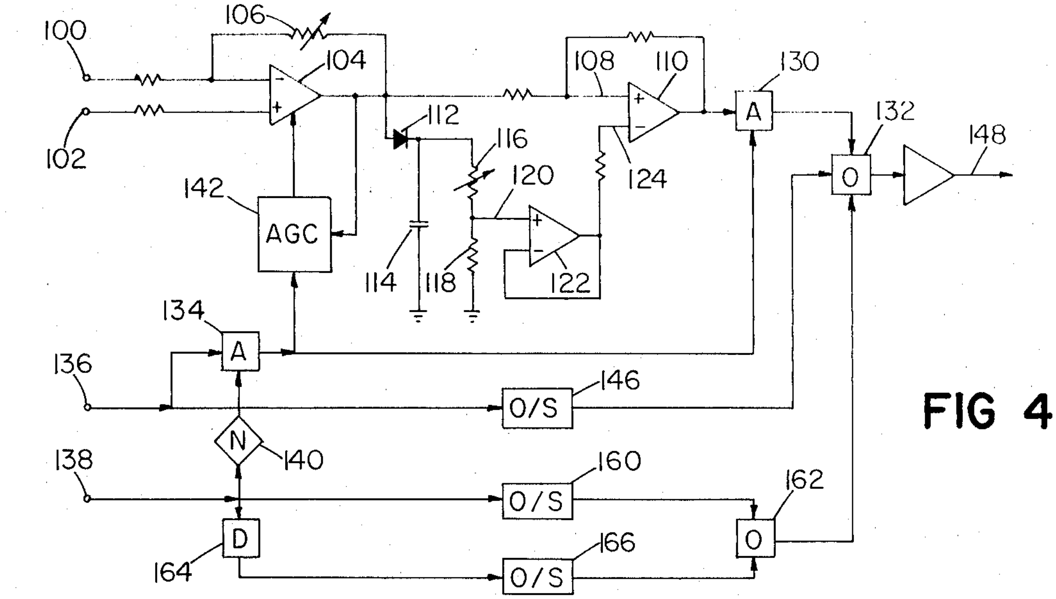
FIG. 4 is a diagram of the scanner signal conditioning circuitry.

A block diagram of circuitry responsive to scanner 14 and gates 18 and 20 is shown in FIG. 4. A differential signal from scanner 14 is applied to terminals 100 and 102 for application through to operational amplifier 104 which has a variable feedback resistor 106. The amplified signal is fed to positive input 108 of comparator amplifier 110 and also fed to a charging circuit through blocking diode 112. The charging circuit includes capacitor 114, variable resistor 116 and resistor 118. The signal from the tap of the voltage divider is fed to the positive input 120 of impedance converter 122 whose output is in turn fed to the negative input 124 of comparator amplifier 110.

Figure 5:
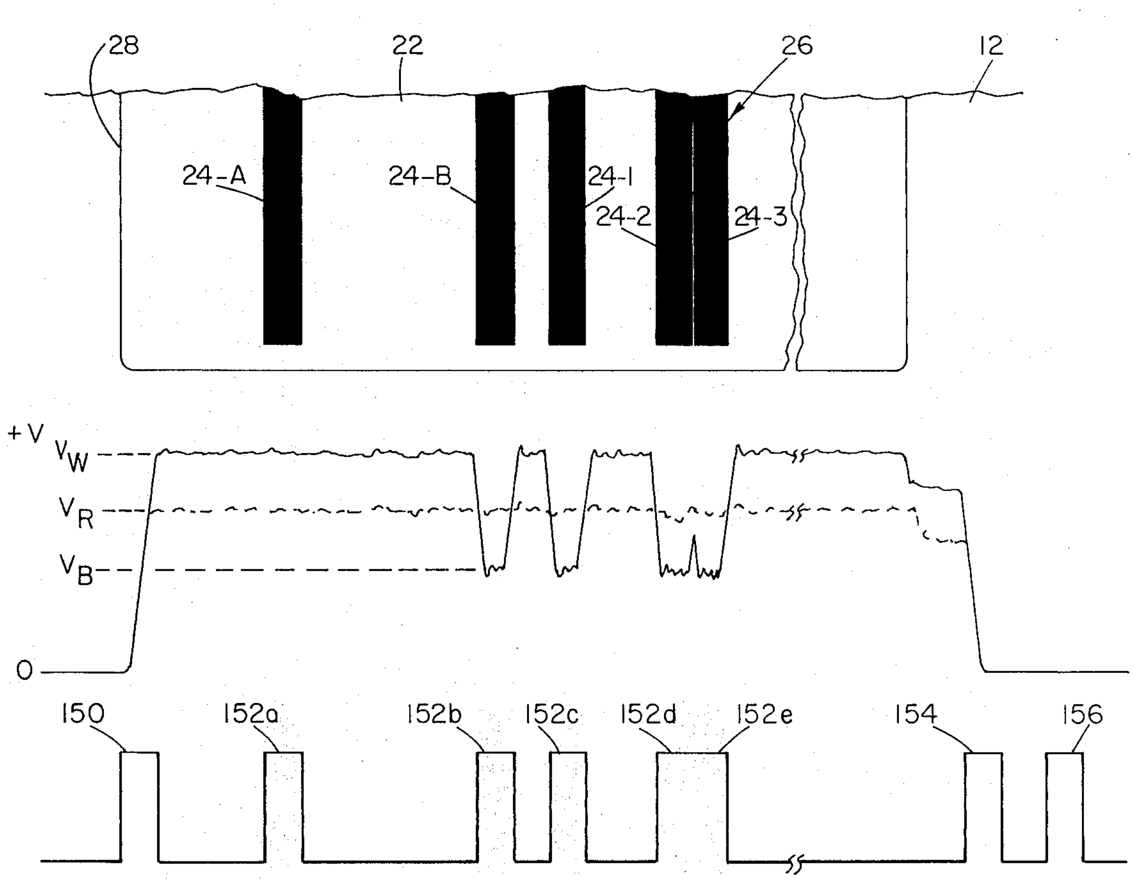
FIG. 5 is a diagram indicating the relative nature of the scanner output signals and the outputs of the scanner signal conditioning circuitry.

The waveform output of this circuit is shown in FIG. 5. Only part of the detected code is shown, that is signals from two control bars 24–A, 24–B and the first two code marks of the sample code. The system has zero voltage (when no light is reflected back to the scanner 14), a voltage level $V_w$ (when the scanner 14 is responding to the white label), a voltage level $V_b$ (when the scanner 14 senses a black code bar), and a voltage level $V_r$ (a reference voltage). In this particular embodiment the voltage $V_b$ is selected to be one-half $V_w$ and the voltage level $V_r$ is selected to be three-fourths $V_w$. These relationships will, of course, vary depending on how "white" the label is and how "black" the mark is, but these factors do not vary to any substantial extent from label to label once the label paper and ink are selected.

$V_r$, the output of the impedance converter circuit 122, provides compensation to facilitate differentiation between the signal values $V_w$ and $V_b$ should the signal levels change as for example due to angular offset of a carton 12 on the conveyor 10.

The output of comparator amplifier 110 is applied through AND circuit 130 whose output is connected to OR circuit 132. A second input to AND circuit 130 is from AND circuit 134 which is conditioned by a signal at terminal 136 from gate 18 and the absence of a signal at terminal 138 from gate 20, that signal being applied to AND circuit 134 via inverter 140. When a transition is applied at terminal 136, AND circuit 134 has an output which conditions AND circuit 130. That output also enables AGC circuit 142 to adjust the gain of amplifier 104 as scanner 14 is now reading the "white" label. A ramp voltage is applied to amplifier 104 and when the amplifier output reaches a reference value $V_w$ the AGC circuit is clamped. The output of AND circuit 134 is also applied to one-shot circuit 146 which is triggered to produce a pulse which is applied through OR circuit 132 for application on output line 148 as pulse 150 indicated in FIG. 5. Normally the sequence of code pulses **152*a*, 152*b*, 152*c*, etc. will then be applied over the output line 148. When gate 20 produces a transition indicating the end of the label has passed scanner 14, the conditioning level is removed from AND circuit 134 and thus from AND circuit 130; one-shot 160 is triggered to produce an output pulse 154 through OR circuit 162 and OR circuit 132 for application to output line 148. The transition is also passed through delay circuit 164 and one-shot circuit 166 to similarly produce through OR circuits 162 and 132 output pulse 156. The double pulse (154, 156**) signals the completion of a code reading sequence.

Figure 6:
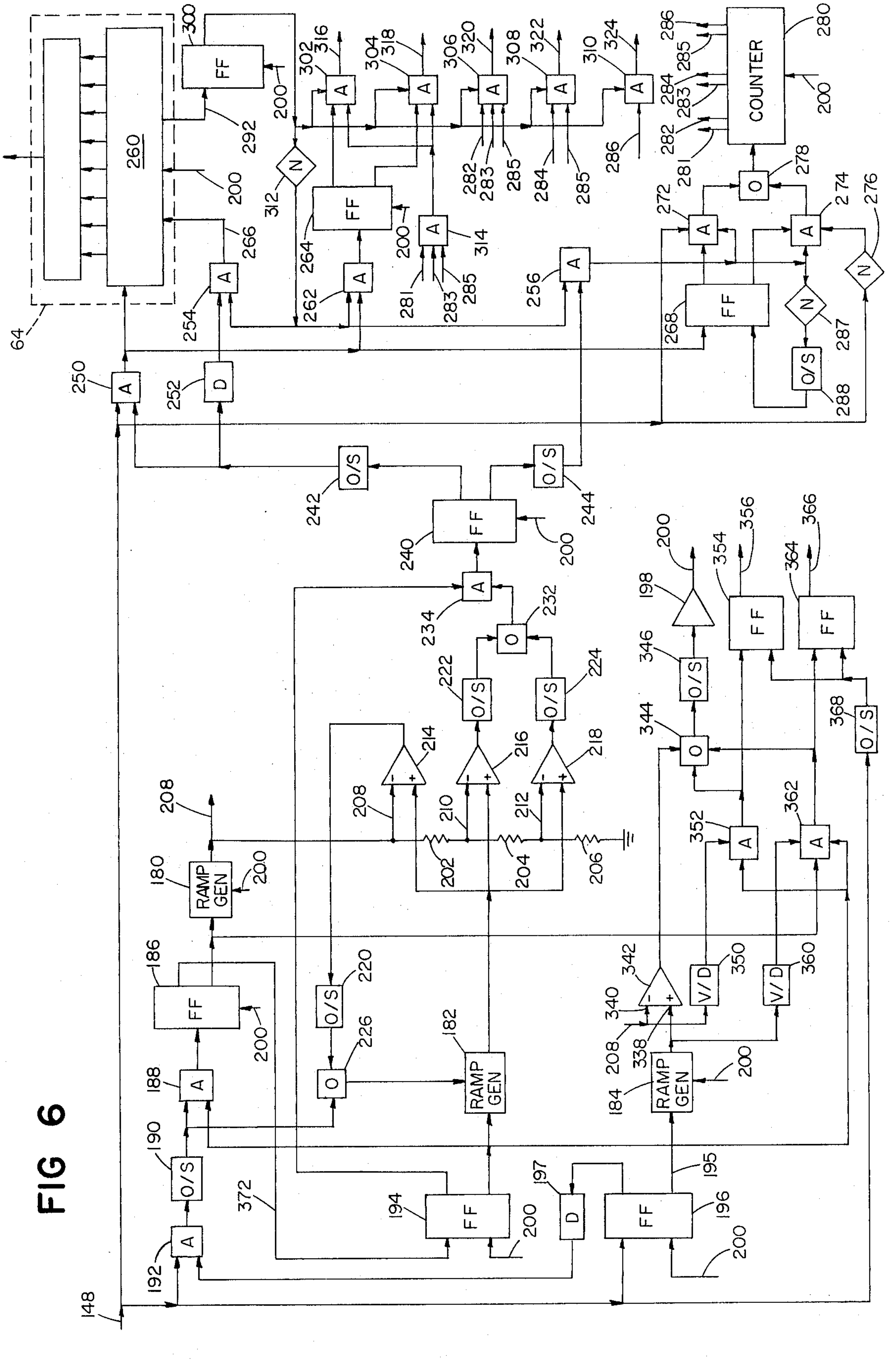
FIG. 6 is a block diagram of the code reading logic.

Details of the code reader logic may be seen with reference to FIG. 6. That logic includes a first (cycle logic) ramp generator 180, a second (digit space logic) ramp generator 182 and a third (code length logic) ramp generator 184. Ramp generator 180 is conditioned by an output of flip flop 186 which is triggered by a signal from AND circuit 188, one-shot 190, and AND circuit 192. Ramp generator 182 is conditioned by a signal from memory circuit 194 which is set by a signal from flip flop 186. The slope of ramp generator 182 is three times the slope of ramp generator 180. The third ramp generator 184 has a relatively long slope time and is set so that there is ample time for the system to read the code on a carton label 22 but short enough so that the code reading logic is reset well before the next carton label 22 is sensed. Ramp generator 184 is started from memory circuit 196 which in turn is triggered by a signal on the input line 148 and reset by a signal over line 200 from driver 198. The reset signal 200 is also applied to other system components including ramp generators 180 and 184, and flip flops 186, 194 and 196.

The output of ramp generator 180 is fed to a voltage divider network that includes resistors 202, 204 and 206 and has outputs on lines 208, 210 and 212. The resistor values are selected so that the output voltage on line 210 is 75 percent of the voltage on line 208, and the output on line 212 is 25 percent of the voltage on line 208. These voltages are applied to comparator amplifiers 214, 216 and 218, respectively. The other input to each comparator amplifier is from the output of digit interval ramp generator 182. Each comparator amplifier output is applied to a one-shot circuit 220, 222, 224, respectively. The output of one-shot circuit 220 is applied to OR circuit 226 which has a second triggering input from one-shot 190.

The outputs of one-shot circuits 222 and 224 are applied to OR circuit 232 and its output is applied to AND circuit 234. The output of one-shot 220 is applied to OR circuit 226 and its output is applied to the reset input of ramp generator 182. The output of AND circuit 234 complements toggle flip flop 240 which is reset by a signal on line 200. The set output of flip flop 240 is applied to trigger one-shot circuit 242, while the cleared output of flip flop 240 triggers one-shot circuit 244. The output of one-shot circuit 242 conditions one input of AND circuit 250 and through delay 252 conditions one input of AND circuit 254; while the output of one-shot circuit 244 conditions one input of AND circuit 256. AND circuit 250 controls the application of signals on input line 148 to shift register 260 and its output is also applied via AND circuit 262 to complement parity flip flop 264 and to set bit error control flip flop 268. The delayed output from AND circuit 254 is applied as a stepping pulse over line 266 to the shift register 260. Thus, the output of one-shot circuit 242 ($STROBE_1$) controls the application of signals to shift register 260, parity check flip flop 264 and error control flip flop 268. The output of one-shot circuit 244 ($STROBE_2$) controls the application of signals to error logic that includes bit error control flip flop 268 which in its set state conditions one input of AND circuit 272 and in its cleared state conditions an input of AND circuit 274. A second input of AND circuit 272 is conditioned by a signal from input line 148 and a second input to AND circuit 274 is conditioned by the absence of such a signal via inverter 276. The third input to each AND circuit 272, 274 is from AND circuit 256. The outputs of AND circuits 272 and 274 are applied through OR circuit 278 to step the bit error counter 280 which is reset by a signal on line 200. The counter 280 includes three stages and is connected as a ripple counter, its outputs 281–286 indicating zero, one, two, three or more than three errors. Flip flop 268 is reset by one-shot 288 which is triggered by the resetting of toggle flip flop 240.

The register full flip flop 300 is set by an overflow output from shift register 260 and its output conditions AND circuits 302, 304, 306, 308 and 310, and, via inverter 312, removes conditioning levels from AND circuits 254, 256 and 262. Shift register 260 contains at this time the code represented by the series of code bars on the carton being sensed, in this example, 10101001.

When a signal is shifted out of shift register 260, register full memory 300 is set. If bit error counter 280 has not been stepped, AND circuit 314 will be conditioned and in turn will condition AND circuits 302 and 304. If the parity is correct, flip flop 264 will be set and AND circuit 302 will produce an output on line 316 while if the parity is incorrect, flip flop 264 will be cleared and AND circuit 304 will produce an output on line 318. Should one error have been detected, AND circuit 306 will produce an output on line 320; should two errors have been detected, AND circuit 308 will produce an output on line 322 and if more than two errors have been detected, AND circuit 310 will produce an output on line 324.

Additional diagnostic circuitry is associated with ramp generator 184. That generator is released when memory 196 is set by the first pulse in a sequence on line 148. The output of the ramp generator 184 and the output of ramp generator 180 (line 208) are applied to terminals 338, 340, respectively, of comparator 342. When the output of the ramp generator 184 exceeds the voltage on line 208, comparator 342 provides an output which is applied through OR circuit 344 to trigger one-shot 346 which conditions driver 198 to produce a reset pulse on line 200. The signal on line 208 is also applied to voltage detector 350 which produces an output should the input voltage rise above a present value. The resulting output is applied to AND circuit 352 which, if conditioned (by reset memory 194), sets memory 354 to produce an output on line 356. The output of ramp generator 184 is also applied to voltage detector 360 which produces an output should that ramp generator output voltage rise above a similar preset value. The output of detector 360 is applied to AND circuit 362 which, if conditioned (by reset memory 194 and reset flip flop 186), sets memory 364 to produce an output on line 366. Both memories 354, 364 are reset by an output of one-shot 368 which is triggered by the input pulse on line 148.

Figure 7:
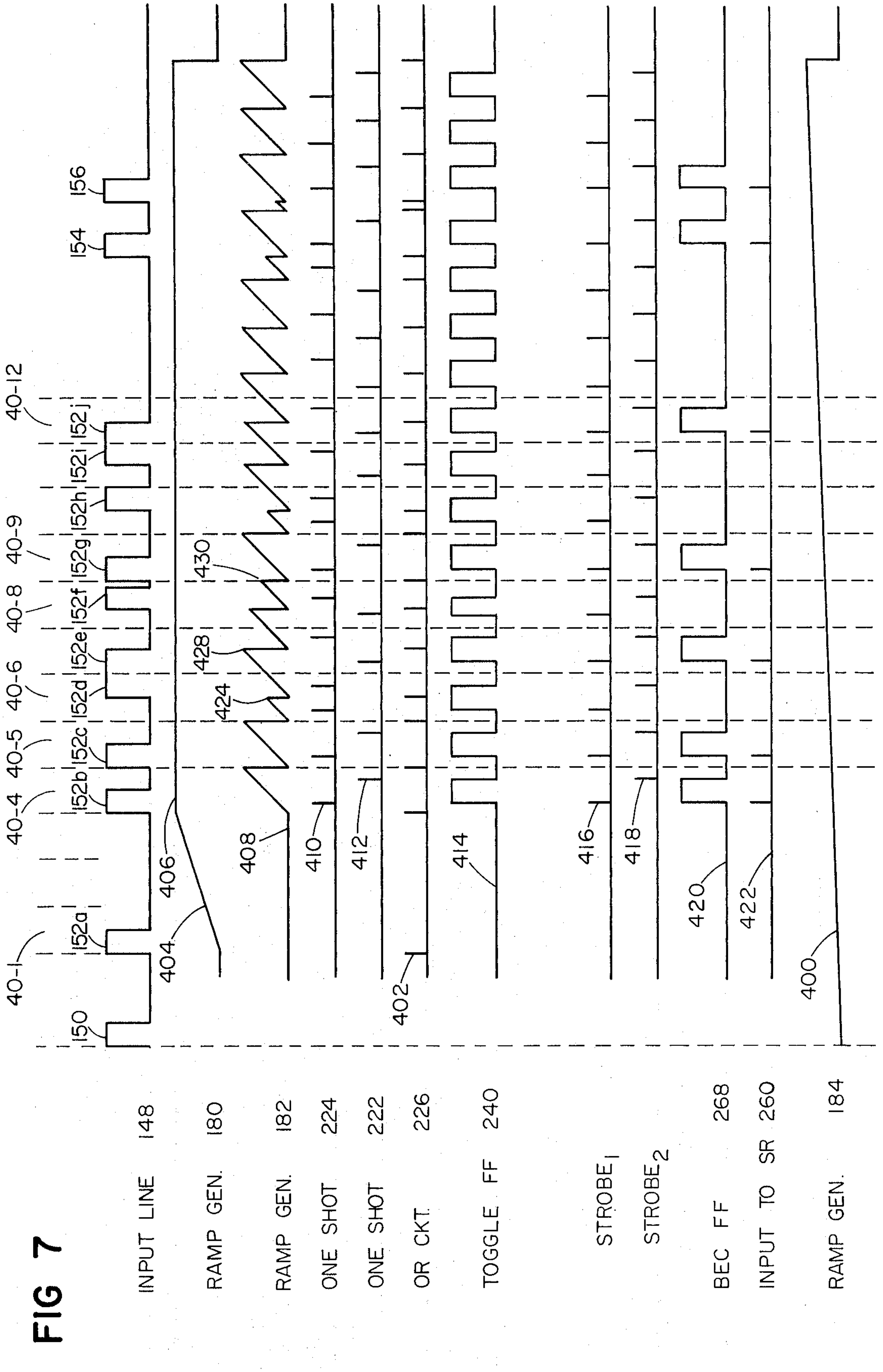
FIG. 7 is a timing diagram indicating a sequence of operations of the system shown in FIGS. 1–6.

Further understanding of the operation of this circuitry may be had with reference to the timing diagram in FIG. 7.

The article detection pulse 150 on line 148 sets memory 196, releasing ramp generator 184(line 400) and triggers one-shot 368 to reset memories 354 and 364. Pulse 150 also samples AND circuit 192 and 250 but is not passed as those AND circuits are not conditioned. The setting of memory 196 produces an output which is applied through delay 197 to condition AND circuit 192.

The next pulse (control data pulse 152a) on line 148 is passed by the conditioned AND circuit 192 to trigger one-shot 190. The resulting output pulse is passed by OR circuit 226 as pulse 402 to reset ramp generator 182; and is also passed by the conditioned AND circuit 188 to set flip flop 186. That operation releases ramp generator 182 to start its digit space defining timing function (line 404).

The next pulse (**152*b*) on line 148 clears flip flop 186, turning off ramp generator 180 so that a digit space defining reference voltage (line 406) is established at terminal 208 that is a function of the speed of the carton 12 past scanner 14. A first sampling gate voltage (25 percent of the reference voltage) is at terminal 212 and a second sampling gate voltage (75 percent of the reference voltage) is at terminal 210. These voltages are applied to comparators 214, 216 and 218 and those circuits provide outputs as a function of voltage from cycle logic ramp generator 182. The clearing of flip flop 186 removes a conditioning level from AND circuit 362 and produces a transition on line 372 which sets memory 194, starting cycle logic ramp generator 182 (line 408**).

Comparator 218 triggers one-shot 224 to produce an output (410) when the cycle logic ramp voltage (line 408) reaches 25 percent of voltage level 406; comparator 216 triggers one-shot 222 to produce an output (412) when the ramp voltage reaches 75 percent of voltage 406; and comparator 214 triggers one-shot 220 to produce an output pulse when the ramp voltage (line 408) equals voltage 406 which is passed by OR circuit 226 to reset ramp generator 182.

Toggle flip flop 240 (line 414) is set by the pulse 410 and reset by the pulse 412 in data space 40–4. Sampling gate $STROBE_1$ (the output of one-shot circuit 242—line 416) occurs at the midpoint of the first half of the data space (25 percent point) and sampling gate $STROBE_2$ (the output of one-shot circuit 244—line 418) occurs at the midpoint of the second half of the data space (75 percent point)—thus sampling the two possible data values in the data space. In the first data space 40–4, one-shot 190 in response to pulse **152*b* produces an output which is passed by OR circuit 226 to reset ramp generator 182. At the 25 percent point, one-shot 224 produces an output which sets toggle flip flop 240 and triggers one-shot 242 to produce $STROBE_1$ which passes the pulse 152*b* signal through AND circuit 250 to shift register 260 (line 422) and then via delay 252 and AND circuit 254 to step shift register 260. The input to the shift register also is applied to the parity count flip flop 264 and to set the bit error control flip flop 268 (line 420). At the 75 percent point one-shot 222 produces an output which resets toggle flip flop 240 triggering one-shot 244 to produce $STROBE_2$ which is passed by AND circuit 256 to sample gates 272 and 274. AND circuit 272 is conditioned but as no signal is on the input line 148, no output is produced. Inverter 287 triggers one-shot 288 at the end of $STROBE_2$ to reset flip flop 268. At the 100 percent point one-shot 220 is triggered to reset ramp generator 182 and the cycle is repeated as indicated in FIG. 7.**

In data space 40–5, the leading edge of pulse **152*c* triggers one-shot 190 whose output resets ramp generator 182 in an updating action. Flip flop 240 is set at the 25 percent time triggering one-shot circuit 242 and the ONE value on input line 148 is inputted into shift register 260 by the $STROBE_1$ signal. The cycle continues as above described with the output of comparator 214 resetting ramp generator 182. In the data bit space 40–6, toggle flip flop 240 is again set at the 25 percent time, triggering one-shot 242, and the $STROBE_1$ signal samples gate 250. As no signal is present on input line 148, a ZERO is inputted into shift register 260, the parity check flip flop 264 is not complemented and the bit error control flip flop 268 remains reset. At 50 percent time in data space 40–6, one-shot 190 has an output which resets ramp generator 182 (point 424—FIG. 7**) initiating a verification sequence.

The output of one-shot 224 at the 25 percent value is passed by AND circuit 234 to reset flip flop 240 and produce a $STROBE_2$ signal to sample the bit error control flip flop 268. As that flip flop is reset, one input of AND circuit 274 is conditioned. However, a bit is present on line 148 and therefore inverter 276 removes a second conditioning input from AND circuit 274 so that no signal is applied to error counter 280.

The code bar **152*e* in data space 40–7 defines a ONE. The two marks are adjacent and the input processing circuitry (FIG. 3) provides a continuous signal level so that one-shot 190 is not triggered and ramp generator 182 is not reset. At 25 percent of the data space 40–7, one-shot 222 has an output which toggles flip flop 240 and a $STROBE_1$ output conditions gate 250 and thereafter steps shift register 260. As there is an input signal level present, a ONE is loaded into the shift register 260, the parity count flip flop 264 is toggled and the bit error control flip flop 268** is set.

There is no output of one-shot 190 at the half space time but ramp generator 182 is reset by the output of comparator 214 (point 428). At three fourths space time, one-shot 224 produces an output which toggles flip flop 240 and triggers one-shot 244 to sample bit error control flip flop 268 (set). As there is no signal present on line 148, no error signal is applied to the bit error counter 280.

At the beginning of the next data space (40–8) there is no leading edge transition; a ZERO is recorded by $STROBE_1$; generator 182 is reset by the leading edge of signal **152*f*;** and a data check is run by $STROBE_2$.

The ability of this code reading logic to override perturbations that might be caused by the code printer not printing a uniform code (e.g., data space uniformity) or by the motion of the conveyor not being ideal (excessive flutter) is indicated by the gap between signals **152*f* and 152*g* at data spaces 40–8 and 40–9. The distortion in this example is caused by a printer aberration. In general, deviations in the width of code bars, or the leading edges of code bars either too early or too late, (printer increment too short or too long) can take place as long as the $STROBE_1$ and $STROBE_2$ relationships are not upset. It should be noted that these deviations can be the result of nonuniform printing and/or nonuniform motion of the carton upon the conveyor. The sum total of these deviations can be, within one data space, ± 24 percent. Accumulative error is eliminated utilizing this "updating" scheme. In the example shown in FIG. 7, the leading edge of signal 152*g* resets ramp generator 182 at 430, due to the gap between signals 152*f* and 152*g* which was not overriden by the scanner signal conditioning logic 60. The decoding circuitry 62 processes the signal correctly, however, as indicated in FIG. 7 and a ZERO is recorded in shift register 260 and no error is recorded in counter 280.**

The data space reading sequence continues until the end of the reading of the code (data space 40–12 in this embodiment) which produces an overflow output from shift register 260 over line 292 to set register full memory 300. The resulting output samples the output gates 302–310 and removes conditioning levels from AND circuits 254, 256 and 262. Ramp generator 182 continues to cycle until the voltage output 400 of ramp generator 184 equals the voltage output 406 of ramp generator 180 at which time comparator 342 produces an output which triggers one-shot 346 to produce a reset pulse on line 200 that resets control flip flops 186, 240 and 264, memory flip flops 194, 196 and 290, ramp generators 180 and 184, shift register 260 and counter 280.

After shift register 260 is full and memory 300 is set, indicating the end of data storage, the two check signals 154 and 156 are applied to input 148. These pulses are not ordinarily in synchronism with the data spaces and may occur before or after reset depending on system conditions. No data is recorded, however, as AND circuit 254 is not conditioned.

Should a label be missing from a carton 12 so that the only input signals were pulses 150, 154 and 156, the check pulses 154 and 156 will simulate timing bars **152*a* and 152*b* and the code reader logic will respond as if it had detected an extremely fast conveyor speed and ramp generator 182 will cycle rapidly and the resulting output signals will cause bit error counter 280 to overflow producing an output from AND circuit 310 on line 324** indicating that a carton passed the reader and no label was detected.

A second diagnostic technique employs memories 354 and 364 which provide indications that either timing signal **152*b* or both signals 152*a* and 152*b* failed to occur. Malfunctions of this type could be caused by lamp failures in the gating circuits or the scanner or by irregular triggering of the code reading logic by transient light conditions. If the timing code bar 152*b* does not occur, the output voltage 404 of ramp generator 180 on line 208 will increase until voltage detector 350 produces an output which is applied to AND circuit 352. As the output of memory logic 194 is conditioning AND circuit 352, that signal is passed to set memory 354 to produce an error indication on output line 356 and also to reset the circuitry by a pulse passed through OR circuit 344 to trigger one-shot 346. Similarly, a voltage detector 360 is coupled to the output of ramp generator 184. If flip flop 186 has not been set (starting ramp generator 180) and memory flip flop 194 has also not been set, two inputs of AND circuit 362 are conditioned. When the ramp generator 184 reaches the voltage level predetermined by detector 360, the resulting output is passed by the conditioned AND circuit 362 to trigger one-shot 346 and at the same time to set memory 364 and produce an output signal on line 366** indicating that no code bars were sensed.

While a particular embodiment of the invention has been shown and described, various modifications thereof will be apparent to those skilled in the art and therefore it is not intended that the invention be limited to the disclosed embodiment or to details thereof, and departures may be made therefrom within the spirit and scope of the invention as defined by the claims.

What is claimed is:

1. Sensing apparatus comprising scanning means for producing electrical digit signals corresponding to code marks in a code on an article as the code is scanned along a path corresponding to the disposition of said code marks, said code defining a series of code mark receiving locations disposed in a row, each said code mark receiving location defining a digit space having a plurality of digit value positions within said digit space in which a code mark can be placed, and one and only one code mark detectable by said sensing apparatus and each said digit space, the position of each said code mark in its digit space defining the value of the digit in that digit space, digit recording circuitry, error check circuitry, circuitry for generating a digit space signal defining a digit space interval of fixed time duration, circuitry for generating a plurality of code-sampling gate signals during the duration of each said digit space interval, said code-sampling gate signals being generated at a series of predetermined points in each said digit space interval, each said point corresponding to a particular digit value position, and steering circuitry for channelling an electrical digit signal gated by a code-sampling gate signal during a first portion of said digit space interval to said digit recording circuitry and for channelling an electrical digit signal gated by a code-sampling gate signal during a second portion of said digit space interval to said error check circuitry.

2. The apparatus as claimed in claim 1 in which a binary code is used and wherein said code-sampling gate generation means circuitry generates a first gate signal in the lefthand portion of each digit space and a second gate signal in the righthand portion of each digit space, and said output producing means produces a first output representing one binary digit when said first gate signal is coincident with the production by said scanning means of an electrical signal corresponding to a code mark, and a second output representing the other binary digit when said second gate signal is coincident with the production by said scanning means of an electrical signal corresponding to a code mark.

3. The apparatus as claimed in claim 1 wherein said circuitry for generating said code-sampling gate signal is responsive to said digit space signal generating circuitry.

4. The apparatus as claimed in claim 1 wherein said digit space signal generating circuitry includes means responsive to electrical signals corresponding to two consecutive control marks on said article for adjusting the value of said digit space signal.

5. The apparatus as claimed in claim 2 wherein said digit space signal generating circuitry includes a first timer and said code-sampling gate generating circuitry includes a second timer, and said logic includes logic responsive to said first and second timers to generate a first gate signal in a first half of each digit space and a second gate signal in the second half of each digit space and a second timer reset signal at the end of each digit space.

6. An article sortation system for sorting articles as a function of a code on each article, each code comprising a series of elongated code marks disposed in a single row perpendicular to the lengths of said code marks, said code defining a series of digit spaces and each digit space defining a plurality of digit value positions, comprising digit recording circuitry, error check circuitry, a scanner including a photosensor for producing an electrical scanner signal as a function of each sensed code mark in said code on an article as the article is moved past said photosensor, scanner signal conditioning circuitry responsive to said electrical scanner signal for producing a series of output code signals, code signal reading circuitry responsive to said output code signals comprising circuitry for generating a digit space signal defining a digit space interval of fixed time duration, circuitry for generating a plurality of code-sampling gate signals during the time duration of each digit space interval, a code-sampling gate signal being generated corresponding to each digit value position in each digit space, means for producing a control output in response to each output code signal produced by said conditioning circuitry coincident with a code-sampling gate signal, steering circuitry for channelling a control output gated by a code-sampling gate signal during a first portion of said digit space interval to said digit recording circuitry and for channelling a control output gated by a code-sampling gate signal during a second portion of said digit space interval to said error check circuitry, and control circuitry responsive to said digit recording circuitry for providing a sortation control signal.

7. The system as claimed in claim 6 wherein said scanner signal conditioning circuitry includes means to generate a reference signal as a function of said electrical scanner signals, and comparator logic for producing said output code signal as a function of an electrical scanner signal and said reference signal.

8. The system as claimed in claim 7 wherein said scanner further includes control sensor means and said scanner signal conditioning circuitry includes logic responsive to output signals of said control sensor means for controlling the initiation and termination of said series of output code signals.

9. The system as claimed in claim 6 wherein said code sampling gate signal generating circuitry includes timer means for repetitively generating a series of gate signals as a function of said digit space signal.

10. The system as claimed in claim 6 and further including means to modify said digit space signal as a function of the speed at which the article is moved past said scanner for code sensing purposes.

11. The system as claimed in claim 9 wherein said digit space signal generating circuitry and said timer means each includes a ramp generator.

12. The system as claimed in claim 11 wherein said scanner further includes control sensor means and said scanner signal conditioning circuitry includes means to generate a reference signal as a function of said electrical scanner signals, comparator logic for producing said output code signal as a function of an electrical scanner signal and said reference signal, and logic responsive to output signals of said control sensor means for controlling the initiation and termination of said series of output code signals.

13. The system as claimed in claim 12 wherein said code-sampling gate generation circuitry generates a first gate signal in the lefthand portion of each digit space and a second gate signal in the righthand portion of each digit space, and said control output producing means produces a first control output when said first gate signal is coincident with an output code signal, and a second control output when said second gate signal is coincident with an output code signal.

14. The apparatus as claimed in claim 13 and further including digit space signal modifying means responsive to two consecutive output code signals for adjusting the value of said digit space signal.

* * * * *